US008054947B2

(12) United States Patent
Startsev et al.

(10) Patent No.: US 8,054,947 B2
(45) Date of Patent: Nov. 8, 2011

(54) APPARATUS AND METHOD FOR MULTIPLEXING COMMUNICATION SIGNALS

(75) Inventors: Vladimir Startsev, Stuttgart (DE);
Rainer Mielich, Keltern (DE)

(73) Assignee: Eicon Networks Corporation, Montreal (CA)

( * ) Notice: Subject to any disclaimer, the term of this patent is extended or adjusted under 35 U.S.C. 154(b) by 1928 days.

(21) Appl. No.: 11/048,044

(22) Filed: Jan. 31, 2005

(65) Prior Publication Data
US 2005/0180455 A1    Aug. 18, 2005

Related U.S. Application Data

(60) Provisional application No. 60/541,190, filed on Feb. 2, 2004.

(51) Int. Cl.
*H04M 1/24* (2006.01)
(52) U.S. Cl. ............. 379/26.02; 379/32.01; 379/212.01; 370/465; 370/352
(58) Field of Classification Search . 379/211.01–214.01
See application file for complete search history.

(56) References Cited

U.S. PATENT DOCUMENTS

| | | | |
|---|---|---|---|
| 5,008,926 A | 4/1991 | Misholi | |
| 5,159,592 A | 10/1992 | Perkins | |
| 5,410,691 A | 4/1995 | Taylor | |
| 5,764,747 A | 6/1998 | Yue et al. | |
| 5,931,917 A | 8/1999 | Nguyen et al. | |
| 5,983,350 A | 11/1999 | Minear et al. | |
| 6,154,465 A | 11/2000 | Pickett | |
| 6,295,276 B1 | 9/2001 | Datta et al. | |
| 6,324,263 B1 | 11/2001 | Sherwood et al. | |
| 6,353,886 B1 | 3/2002 | Howard et al. | |
| 6,407,997 B1 * | 6/2002 | DeNap et al. | 370/352 |
| 6,614,811 B1 * | 9/2003 | Alaimo et al. | 370/498 |
| 7,280,529 B1 * | 10/2007 | Black et al. | 370/352 |

FOREIGN PATENT DOCUMENTS

| | | |
|---|---|---|
| EP | 0 483 547 A1 | 5/1992 |
| EP | 0 513 484 A2 | 11/1992 |
| EP | 1126685 A2 | 8/2001 |
| EP | 1 560 409 A2 | 8/2005 |
| GB | 2325121 A | 11/1998 |
| GB | 2325122 A | 11/1998 |
| WO | WO-96/05681 A1 | 2/1996 |

OTHER PUBLICATIONS

Partial European Search Report in Application No. EP 05 25 0528 issued Feb. 11, 2008.

* cited by examiner

*Primary Examiner* — Fan Tsang
*Assistant Examiner* — Ibraham Sharifzada
(74) *Attorney, Agent, or Firm* — Edwards Angell Palmer & Dodge LLP; George N. Chaclas

(57) ABSTRACT

In a PBX environment, a middleware module abstracts communication cards so that the plurality of channels associated therewith are grouped for efficiency. The middleware module recognizes unoperational channels, and restarts the hardware associated with the channels as well as allowing conferencing and transferring calls when the PBX switch does not support same. Preferably, for outgoing calls, the middleware adapter controls the state of interfaces for all hardware adapters and tries to deliver calls over active interfaces. In case of failure, the middleware adapter investigates and makes a decision if the call should be delivered over another adapter. In this way, redundant and highly available solutions are implemented transparent to application and interface drivers. For incoming calls, the middleware adapter accepts calls from all hardware adapters and presents these calls to applications as if these calls are issued by one adapter.

9 Claims, 6 Drawing Sheets

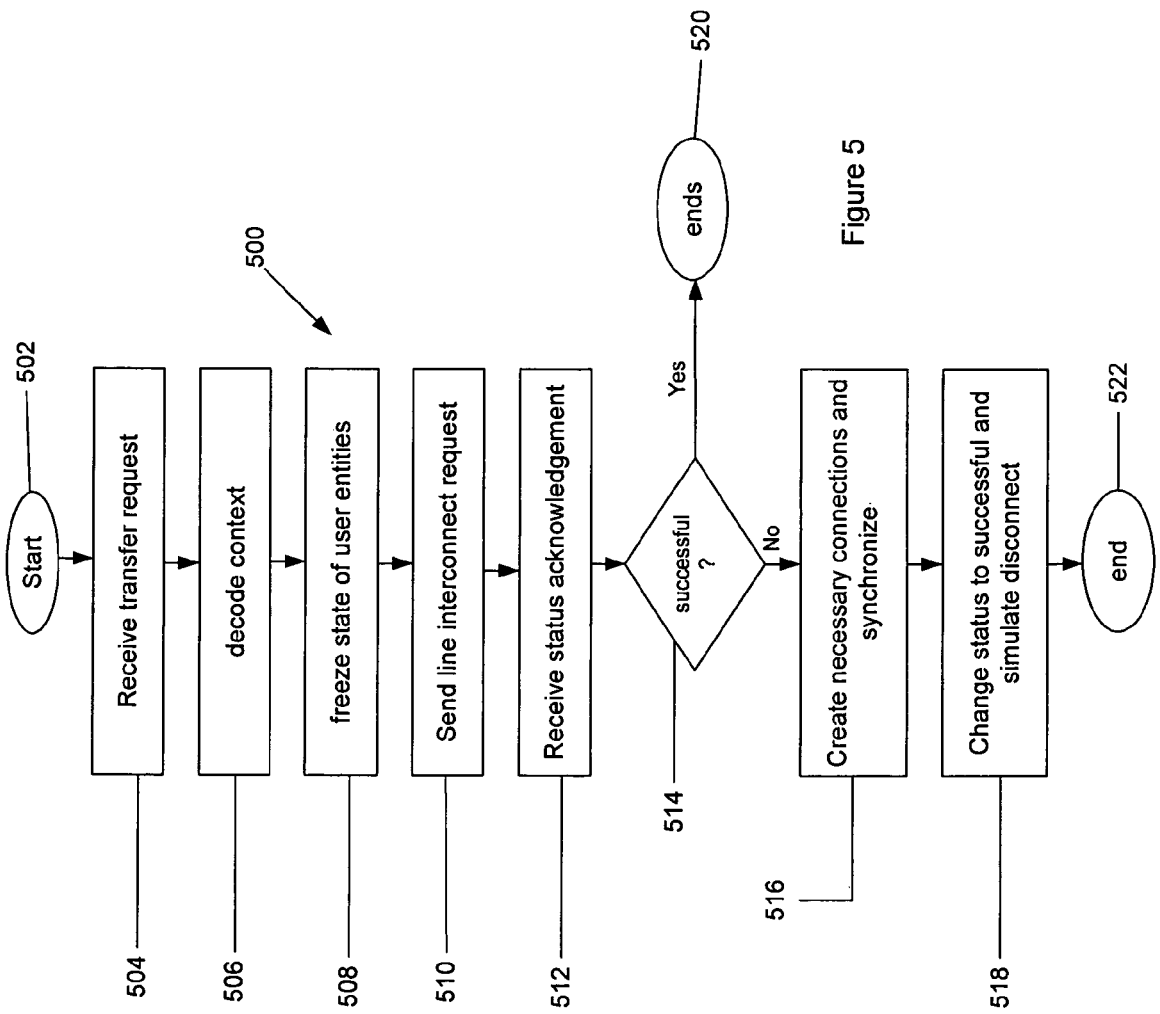

APPARATUS AND METHOD FOR MULTIPLEXING COMMUNICATION SIGNALS

CROSS-REFERENCE TO RELATED APPLICATION

This application claims priority to U.S. Provisional Patent Application No. 60/541,190, filed Feb. 2, 2004, which is incorporated herein by reference.

BACKGROUND OF THE INVENTION

1. Field of the Invention

The subject disclosure relates to middleware for communication networks, and more particularly to an improved middleware application for facilitating operation between low level and high level hardware drivers.

2. Background of the Related Art

For companies with more than a handful of employees, connecting every employee's telephone to the public telephone network is not practical because the public telephone network applies a monthly charge to each line. Moreover, internal calls would require dialing every digit and if the company is spread across several locations, inter-location calls would be assessed long distance charges. As a result, companies establish a private business exchange (hereinafter referred to as "PBX" but also known as "PABX").

The PBX is a telephone switching center owned by the company rather than the common carrier. Various locations of the company can be interconnected by a dedicated line such as a trunk line so that the PBX can encompass the entire company. Users of the PBX share a certain number of outside lines for making and receiving telephone calls external to the PBX. The PBX performs a variety of functions, such as establishing and maintaining connections or circuits between the telephones of two users. Facsimile machines, communication modems and other communication devices can be connected to the PBX as desired. The PBX also provides other features such as usage information for accounting purposes, speed dialing, call forwarding, music on hold and the like.

Referring to FIG. 1, a high-level view of an environment including a PBX 110 is referred to generally by the reference numeral 100. An electronic rack 102 houses the required software and hardware for the PBX 110 to properly operate the telephones 104, and communicate with the computers 106, facsimile machines 108 and other networks 114. In this sense, the electronics rack 102 holds at least one server. It will be appreciated that "server" refers to the program that is managing the associated resources and that several "servers" may be incorporated within one physical component or alternatively multiple components may be coupled to execute a single "server" program in order to accomplish the desired performance.

The other networks 114 could include telco networks, WAN, LAN, the Internet and the like. It is to be appreciated that where only one telephone 104, one computer 106 and one facsimile machine 108 are shown for simplicity, several hundred or more of each of these could actually be utilized. The interface that allows each of the components to communicate is often proprietary to the manufacteror and, therefore, connected devices must comply with the protocol. The PBX can alternatively use a standard interface that supports connection with many devices. ISDN and T1 are common digital standards for fixed devices. For simplicity, all of the switching equipment is shown within the electronic rack 102 but it would be appreciated by those of ordinary skill in the pertinent art that such localization is not required. The clients 104 may be stand alone desktop personal computers, part of a network or like arrangement. It is also envisioned that the environment 100 has routers, firewalls, subnets, buffers, buses, balancers, and like devices as would be appreciated by one of ordinary skill in the pertinent art. For clarity, such devices are not illustrated.

The electronic rack 102 houses additional hardware in a plurality of electronic racks 112. The hardware contains memory for storing the software that provides the desired features. For example, a voicemail module is a common specific application with dedicated hardware that mimics the functions of an answering machine from a centralized location rather than at each desktop. In order for the voicemail module to communicate with the other components of the PBX, the communication protocols must be defined. An Application Programming Interface (hereinafter "API") is a set of definitions of the ways in which the various modules communicate with each other. In effect, the API bridges the communication gap between lower-level and higher-level software. Typically, the API provides a set of commonly-used functions so that programmers can utilize the provided functions without having to reinvent every function. Often, a program written for a first API will not work directly with another second API without an intermediate layer that adapts the program for use with the second. A commonly used API is the CAPI standard available from Eicon Networks. For telephony on Microsoft Windows platforms, TAPI is a commonly used API. TAPI is middleware between the device drivers of actual hardware such as modems, and the high-level applications.

In view of the above, several systems have been developed to further enhance and increase the functionality of the PBX. Many electronics racks 102 contain a plurality of communication cards such as basic rate interface, primary rate interface, Analog, Robbed Bit Signalling etc (hereinafter "BRI") cards for accessing channels associated with each BRI card. There are problems associated with multiple BRI cards because each BRI card is busy while the associated channel is in use. While a BRI card is busy, an API recognizes the BRI card as unable to be selected as a free and operable card. As a result, a delay may occur as an API searches card by card for an available BRI card. There is a need, therefore, for an improved module which permits utilizing communication cards in a flexible arrangement so that the PBX capabilities can be efficiently utilized.

In addition, a BRI card can often hang in an inoperable state or actually be removed from the electronics rack 102. In the prior art, if the BRI card is called, the API that is attempting to utilize the BRI card may not be able to successfully recognize the error and properly handle corrective action. If the BRI card is merely hung up, no middleware is in place to reload and restart the problematic card. Further, new BRI cards may be installed without proper execution of the loading and activation procedure. As a result, the newly added BRI cards would not be operational. Thus, there is a need to isolate the BRI cards from the upper level API in order to insure proper operation. The isolation module can further recognize and activate newly added or problematic cards, provide error messages to the upper level API when hung up BRI cards are called and prevent further calls of inoperable BRI cards.

Still further, when the PBX switch does not support conference calling and transferring calls, an attempt at accomplishing the same results in failure. Thus, there is a need for a software module that can detect the failure and overcome said failure to establish the desired conference call or transfer.

In addition, calls are often redirected multiple time through multiple PBX to finally arrive at an adapter module. The originator PBX typically sends a path replacement proposal to the real destination of the call and a special application is required to handle the path replacement proposal. There is a need, therefore, for an adapter module that can transparently handle the path replacement proposal.

SUMMARY OF THE INVENTION

It is an object of the subject disclosure to provide a module that abstracts a plurality of communication cards so that the plurality of channels associated therewith can be grouped for efficient utilization.

It is another object of the subject disclosure to provide a module that recognizes unoperational channels, and reloads and restarts the hardware associated with the channels.

It is a still further object of the subject disclosure to provide a module that allows conference calling and transferring calls when the PBX switch does not support these features.

In one aspect of the present invention, a "Hot Plug" procedure addresses the call processing (or call forwarding) when adapter hardware is removed from the system. The same processing also preferably occurs if the adapter (also referred to herein a MTPX adapter or M adapter) detects an adapter failure. Then, the MTPX adapter simulates a standard disconnection procedure and reports as the cause a "Layer 1 error" indicating a physical problem such as a physical problem to all active applications with a connection at that time. Moreover, the MTPX adapter will maintain full functionality of applications if adapter hardware is not available (e.g., maintain a list of applications that are prepared for receptions of incoming calls and simulate call failure for applications that try to issue an outgoing call). "Interface Layer 1 error" is reported to like applications as cause for disconnections. Inserted, started, or activated adapter hardware is immediately available to all connected to the MTPX adapter applications (e.g., fill "hot" adapter hardware insertion/abstraction that allows all to use applications and high level interface drivers that are not developed for like operation without changes).

In another aspect of the present invention, the M adapter abstracts all connected adapter hardware as one adapter. For outgoing calls, the MTPX adapter controls the state of interfaces for all Hardware adapters and tries to deliver calls over active interfaces. In case of failure, the MTPX adapter investigates the cause of the failure and makes a decision if the call should be delivered over another adapter. In this way, redundant and highly available solutions are implemented transparent to application and interface drivers that are connected to the MTPX adapter. In the case of incoming calls, the MTPX adapter accepts calls from all hardware adapters and presents these calls to applications as if these calls are issued by one adapter.

According to a further aspect of the present invention, the MTPX adapter acts as a call detection application in an "add hook" approach that distributes calls in three passes. The first pass receives a call and broadcasts the call to all applications. Because the MTPX adapter is active, all applications and drivers use the MTPX adapter such that the call is delivered to MTPX adapter only.

In the second pass, the MTPX adapter receives notification about an incoming call and investigates the list of applications that are waiting for the call. The MTPX adapter performs a search for an application that is programmed as "third layer" call distributor (e.g., looks for application Identifier that can be set using the configuration interface. If not set, the MTPX adapter uses a CAPI driver Ident as the default). If no Identifier was found, the MTPX adapter performs a broadcast of the incoming call to all applications and interface drivers that are waiting for incoming calls. If the Identifier was found, the MTPX adapter re-packages the call information in a special format that cannot be understood by "normal" applications (e.g., call will be ignored by any application that is not able to decode this message) and forwards the call to the application that owns the Identifier of interest. It is possible to start an application that acts as a Global Call Detector (GCD). This means that the one and only GCD application has exclusive rights to receive any call if such an application is started (even if other applications are listening to incoming calls). In detail, on top of the middleware MTPX adapter, multiple other drivers with different APIs (like Capi, Port Driver and the like) can be present, and on top of one of these APIs resides the GCD. Therefore, it is possible to configure the identifier of the driver where the GCD resides in order to offer incoming calls just to this specific driver. This identifier can be a name like 'CA20'. In case of an incoming call the GCD can:

1. connect the call and analyze the contents of the data delivered from the network. The result of the analysis is a type of call like FAX, Voice, Modem, Digital Data (e.g., it is used but not restricted to High Level Data Link Control Protocol HDLC, X.75 Layer 2 Transport Protocol), PIAFS (Personal Handyphone System Internet Access Forum Standard). Once the call type is detected, the GCD can forward the call to a compatible application; or 2. Not connect the call but analyze the incoming call parameters including, but not restricted to, Calling Address or Bearer Capability (this identifies the type of the call e.g., digital or voice). Once the call type is detected (or whatever needs to be detected like Called Numbers), the GCD can forward the call to a compatible application.

If the application such as a default CAPI driver receives a "tunneled" call, prior art versions of CAPI driver would ignore the call. In the subject methods, it is envisioned that the driver will look in the list of applications that are waiting for a call at the CAPI interface for one that is labeled as "Global Call Detector". If such is found, the CAPI driver un-tunnels the information and forwards the incoming call just like any other call to the Global Call Detector. The CAPI ensures at same time that the Global Call Detector application receives only like "tunneled" calls.

Further, other applications will receive any other call that is not suited for detection (for example a call that was already re-directed to other CAPI application). A Global Call Detector (or call type detector, "ctransfer" application) receives information about the incoming call and consults the configuration about the future processing of the call to determine whether to reject, redirect without accepting the call, accept the call and/or perform detection to forward or disconnect such a call.

In the third pass, once an incoming call is delivered, the MTPX adapter waits for decision. The incoming call can be disconnected by a command received from a Global Call detector. The MTPX adapter will reject the incoming call and the communication adapter such as a Diva adapter will clear the call. The M adapter could also reject the call because no Global call detector application was found. In this case, there are two options: 1. Un-tunnel the call and broadcast this call to all applications like one regular call; and/or 2. Stop call processing and disconnect the call.

The M adapter can accept a call from a Global Call Detector received and initiate a connection procedure. The M adapter can also redirect a call to all specifications or just specific applications and, then, simulate disconnect to the Global Call detector application while forwarding the call (e.g., to simulate incoming call) in accordance with a received call as part of the "Call Redirection" command.

In accordance with yet another aspect of the present invention, when a Global Call detector application has accepted a call, then the call detection procedure is started. The call detection procedure includes the following steps of: activating a routine for recognizing human speech; activating a DTMF/MF for line tone detection; and activating a Fax/Modem calling tone detection. In a preferred embodiment, the line of hardware used is the Diva line of hardware available from Eicon Networks, the assignee of the subject application. The call detection procedure may further include the steps of: activating "Generic tone detection" to detect any "single tone" or "tone range" of interest with desired resolution. Optionally, the customer can download their own detection task to a Diva adapter DSP hardware to allow detection and/or generation of vendor specific signals or tones.

In one embodiment, a system is implemented by a "Global Call Detector" (ctransfer) application call type detection procedure using Diva Server DSP hardware indications and operations as follows (e.g., tone detection by DSP hardware run parallel with all additional detectors as implemented by ctransfer) as follows:

1. Start reception of the bit transparent data stream from Diva hardware.
1.1 Start investigation of incoming data stream for HDLC (High Level Datalink Control Protocol) framing.
   1.1.1 Start investigation of detected HDLC frames for X.75, (X.75 being the signaling protocol for X.25 communications, where X.25 is packet switched data network protocol for Wide Area Network communications).
   1.1.2 Start investigation of detected HDLC frames for X.75 with V.42bis compression.
   1.1.3 Start investigation of detected HDLC frames for X.75 with V.42bis compression.
   1.1.4 Start investigation of detected HDLC frames for V.120.
   1.1.5 Start investigation of detected HDLC frames for ASYNC or SYNC PPP framing.
1.2 Start investigation of incoming data stream for PIAFS (Personal Handyphone System Internet Access Forum Standard) framing (preferably, two parallel running detectors. One for 32 KBit PIAFS connections and one for 64 KBit PIAFS connections).
2. Start investigation of incoming data stream for V.110 framing (multiple parallel running detectors, one for every adaptation rate). Due to fact that PIAFS frames can trigger V.110 frame detector and PIAFS frame V.110 detector is started with delay. This delay allows PIAFS detector to detect PIAFS frames if any (PIAFS frames are protected by checksum that prevents wrong detections) before V.110 detector can recognize PIAFS frame as V.110 frame. The V.110 detector that wants less time to detect the frame due to fact that V.110 sync frame is shorter as PIAFS frame.

In another embodiment, parallel to the call detection operation, a Global Call detector application plays a greeting message provided by a customer or generated dependent on the detected event signals/tones. The information (e.g., detected/not detected) from all detectors is passed to a decision machine together with information about the type of the incoming call. The decision machine makes a final decision about the type of the incoming call, particularly when different detectors indicate detection. Preferably, the decision machine uses following priority list:

1. All protocols with frames that are protected by checksums (e.g. HDLC based, PIAFS based and the like) always win due to fact that checksum provides a very high level of protection against wrong detections.
2. Detected standard tones (e.g. Fax calling tone, Modem calling tone, Line tones).
3. DTMF/MF.
4. Human Speech and V.110. It is possible that V.110 frames will trigger human speech detector and vice versa. In this case, signaling information (call type) is used to discriminate between both types of the call due to the fact that this is highly improbably that a V.110 call is signaled as "Voice" call.
5. Timeout. If none of detectors were able to detect one protocol for a specified amount of time, then it is possible to associate with this condition one protocol that depends on the specific environment.

In still another embodiment, a call detection operation uses detected protocol, parameters such as bit rate and signaling information as a key for look up in the configuration for action that is associated with the current type of the call. During the call detection operation, this information is used for future call processing (e.g., redirection of the call or abort of call processing and disconnect current call).

In a preferred embodiment, a General Redirection procedure as seen by the MTPX adapter includes the steps of the MTPX Adapter receiving a redirect command, simulating disconnect to the application that issued redirect command, and investigating the redirect command and constructing new indication about the incoming call in accordance with information from the call redirect command. The MTPX adapter simulates the incoming call to all applications and high interface drivers that match this new simulated incoming call. If the application accepts the call, then the MTPX adapter simulates connection procedure for this application using information received by connection procedure of "original" call and information contained in call redirection command.

In accordance with call redirection command and dependent on the call state, the MTPX adapter can also disconnect the bearer connection, if any, and let a new call owner assign a new bearer protocol stack to call (i.e. new hardware resources) and establish a new bearer connection. The MTPX adapter can additionally disconnect the bearer connection, but use the call redirection bearer protocol stack requested by the originator so that a new call owner can establish a new bearer connection. Preferably, the MTPX adapter preserves (i.e. does not disconnect) the bearer connection and keeps track of the bearer connection while the call redirection procedure is running.

Preferably, in case a new call owner tries to establish a new bearer connection, the MTPX adapter simulates a bearer level connection until the state of the simulated and the real existing connection is not the same. In effect, the MTPX adapter "short-cuts" real and simulated bearer connections and gives control over the future state of the bearer connection to a new call owner.

In another embodiment of the subject disclosure, a middleware application has a plurality of logical entities. An "entity" is the handle that is used to create the relationship between the application running on the host application. Every "entity" can be used to create/accept and to release the calls. In order to get an entity, one application sends an assign request to a Diva adapter (or to an MTPX adapter) and receives back one handle. All future requests/responses and indications are related to this handle. For simplification, the handle is named "entity". Once an application has assigned one handle, it can create outgoing calls, but still can not receive incoming calls. To receive notification about incoming calls, the application should issue one INDICATE request. The entity that receives the "INDICATE" request has the name "Listener" entity. Every "Listener" entity can receive and handle one call.

In a further preferred embodiment, the middleware application, at one side, the MTPX adapter provides entities to applications. These are "User" entities (EUsr). At the other side, the MTPX adapter consumes entities from Diva adapters. These are "Xdi" entities (EXdi). Based on the amount of "Listener User Entities", the MTPX adapter calculates the amount of Listener XDI entities that are necessary to process all incoming requests. A "Listener state machine" maintains the necessary amount of Listener XDI entities on every Diva adapter. For this reason, the "Listener state machine" always know how many User entities are able to receive a call, how many Xdi entities are able to receive call, how many entities are allowed on specific adapters and maintains an amount of XDI entities that will not overload the adapter but allows forwarding all incoming calls from this adapter to user entities if necessary. For example, if a call was redirected using the bearer protocol stack as requested by initiator of the call redirect procedure and not one as requested by the current application, then it is possible that the type of messages between API and application depends on the type of user protocol and differ. In this case, the User entity will provide conversion between used protocol and the requested by application protocol. In this way older applications can benefit from use of newer communication protocols. For example, Suppose one V.110 application that should work in Japan, where PIAFS protocol is used. Also "ctransfer" application accepts the call and issues internal redirect procedure to this V.110 application. In the redirect request, "ctransfer" will advise the MTPX adapter to ignore the request by the application V.110 protocol stack and use instead PIAFS protocol stack. However, the application side state machine of V.110 protocol differs from the application side of PIAFS protocol, so the V.110 application still will not work. To overcome this problem, the MTPX adapter will terminate the PIAFS protocol self and emulate towards the application V.110 application level interface. At same time, bearer data is forwarded without changes. This allows one V.110 application, developed for use in Europe to be used in Asian area without changes. MTPX implements this procedure not only for this protocol combination but others as would be appreciated upon review of the subject disclosure by those of ordinary skill in the art. Most Diva adapter protocol stack combinations are supported, as far as necessary. This "state machine conversion" is modular, extensible, and support for new protocol combinations possible. In another object of this embodiment, due to fact that "ctransfer" allows detecting the protocol, it is possible to create one configuration file that allows one simple application to work with a plurality of protocols (for example application developed for operation with Analog Modems will work with V.110, PIAFS, X.75, HDLC, X.25, and the like). Also, application side state machines (i.e. messages and state machines used to control protocol) differ from protocol to protocol.

It should be appreciated that the present invention can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings wherein:

FIG. 5 is a flowchart illustrating an embodiment of a process for transferring a call in a PBX environment where the PBX switch does not support call transfers.

DETAILED DESCRIPTION OF PREFERRED EMBODIMENTS

Figure 1:
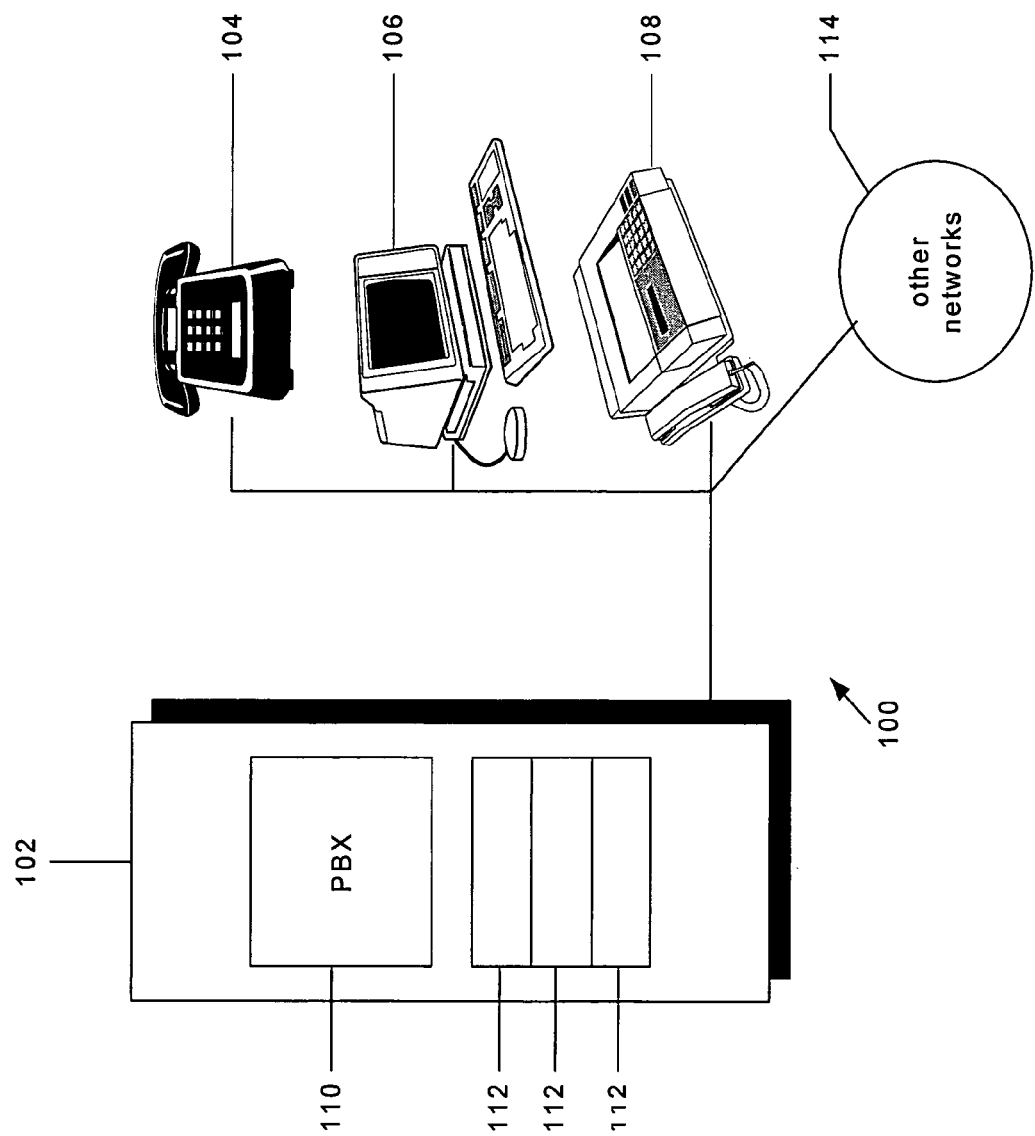
FIG. 1 is an overview of an environment having a PBX in which an embodiment of the present invention may be used.

The present invention overcomes many of the prior art problems associated with PBX. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Figure 2:
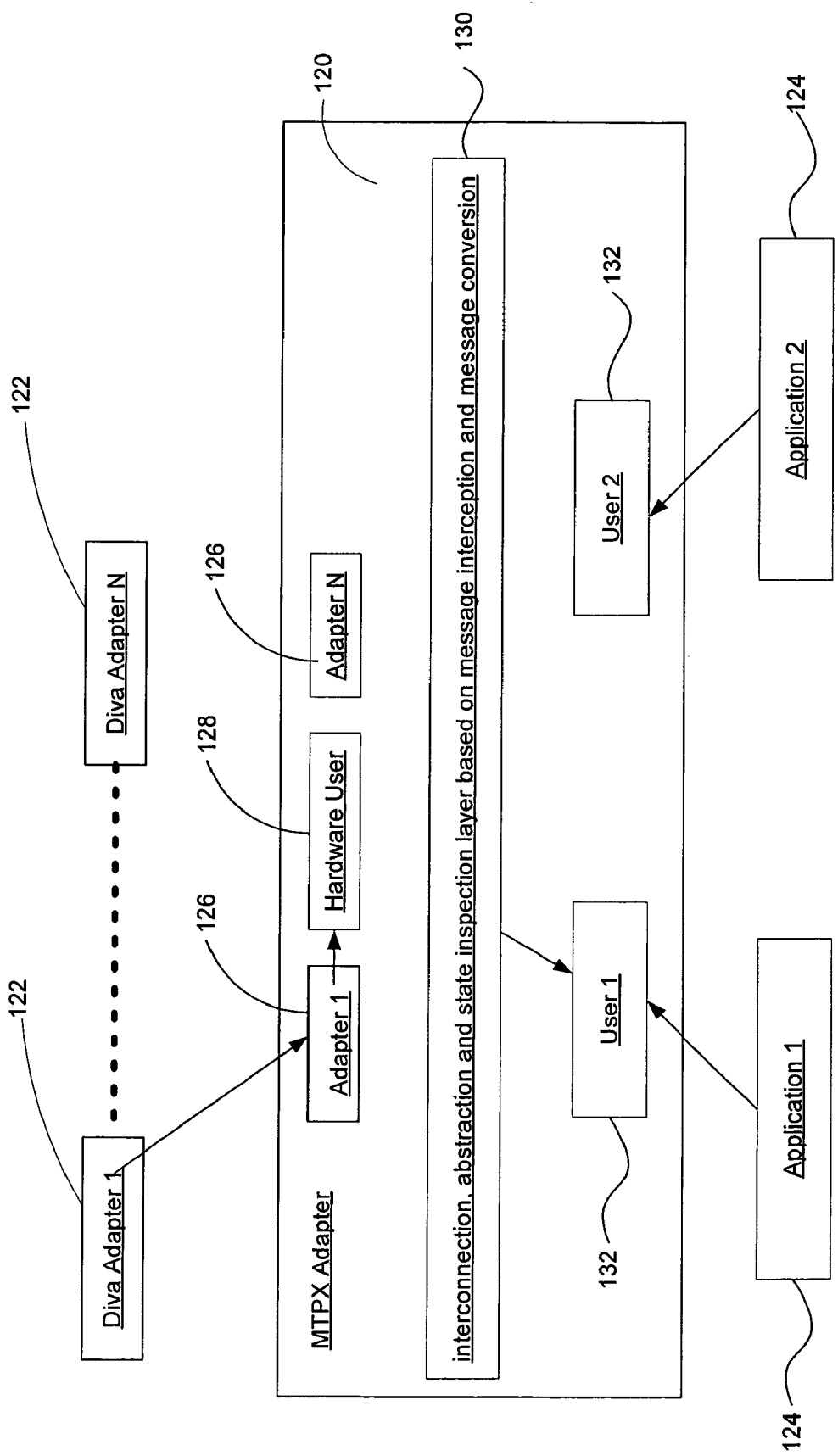
FIG. 2 is a somewhat schematic view of a M adapter utilized in an embodiment of the subject invention.

Referring to FIG. 2, an M adapter 120 connected to a plurality of Diva adapters 122 is illustrated in a schematic form for clarity and simplicity. Exemplary usage environments for the M adapter 120 are on a printed circuit board or plurality of printed circuit boards that would be connected within one of the racks 112 of the electronics rack 102 of FIG. 1. In a currently preferred embodiment of the present invention, the server for running the PBX 110 is a PC/AT compatible computer with at least a 133 MHz processor, a server operating system, at least 15 MB of free space on the hard drive for the adapter application, and a card slot to receive an associated adapter printed circuit board.

Still referring to FIG. 2, the M adapter 120 is used to provide modem emulation in communication networks among other things. In a currently preferred embodiment, the M adapter 120 interface chain is as follows:

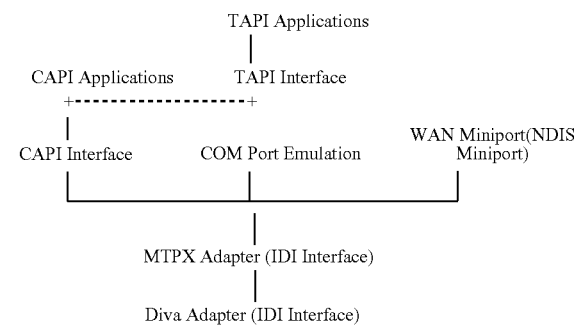

The Diva Adapters 122 can be any Diva adapter such as: Diva BRI; Diva PRI; and Diva Analog adapter available from the assignee of the subject application. It is recognized that any of a plurality of adapters could be used not just a single Diva adapter 122. In this way, any applications 124 (such as CAPI, TAPI and the like) are isolated from any real adapter and able to forward calls from one high end interface driver to the other, independent from the used adapter or interface type. This is achieved by the fact that the MTPX Adapter 120 exposes the same interface as every real Diva adapter. In other words, the IDI Interface and all drivers are written on top of this interface or on top of other interfaces that are derived from the IDI interface.

The MTPX adapter 120 preferably includes an internal adapter module 126 for interfacing with each Diva adapter 122. The internal adapter modules 126 interact with a hardware user module 128 that is preferably a communication adapter with a low level driver interface, e.g., an IDI. In turn, the hardware user module 128 interacts with a status module 130 that stores all states of all calls. Internal user modules 132 and the like allow interaction with the status module 130.

Figure 3A:
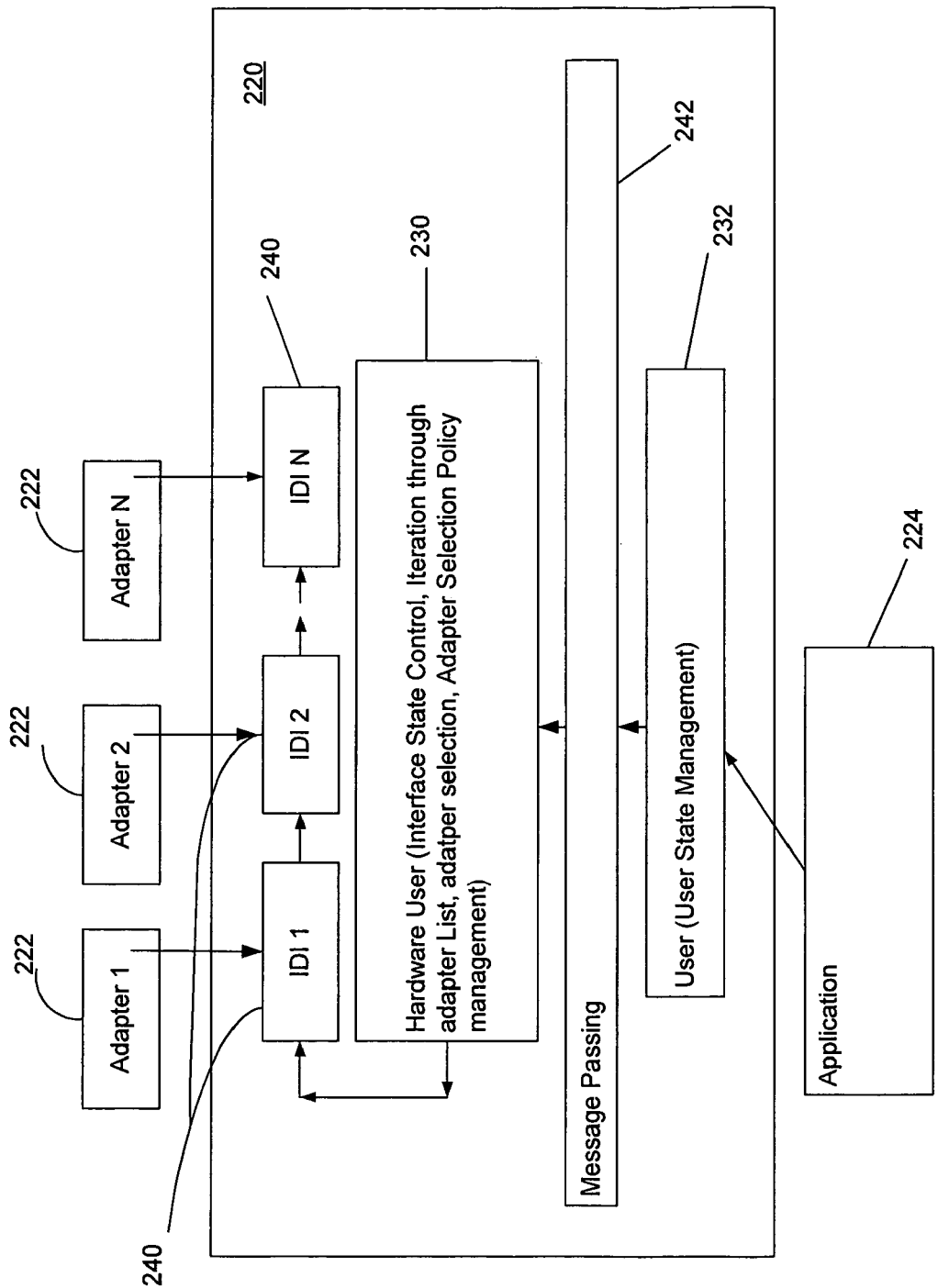
FIG. 3A is a somewhat schematic view of a M adapter utilized in another embodiment of the subject invention.
Figure 3B:
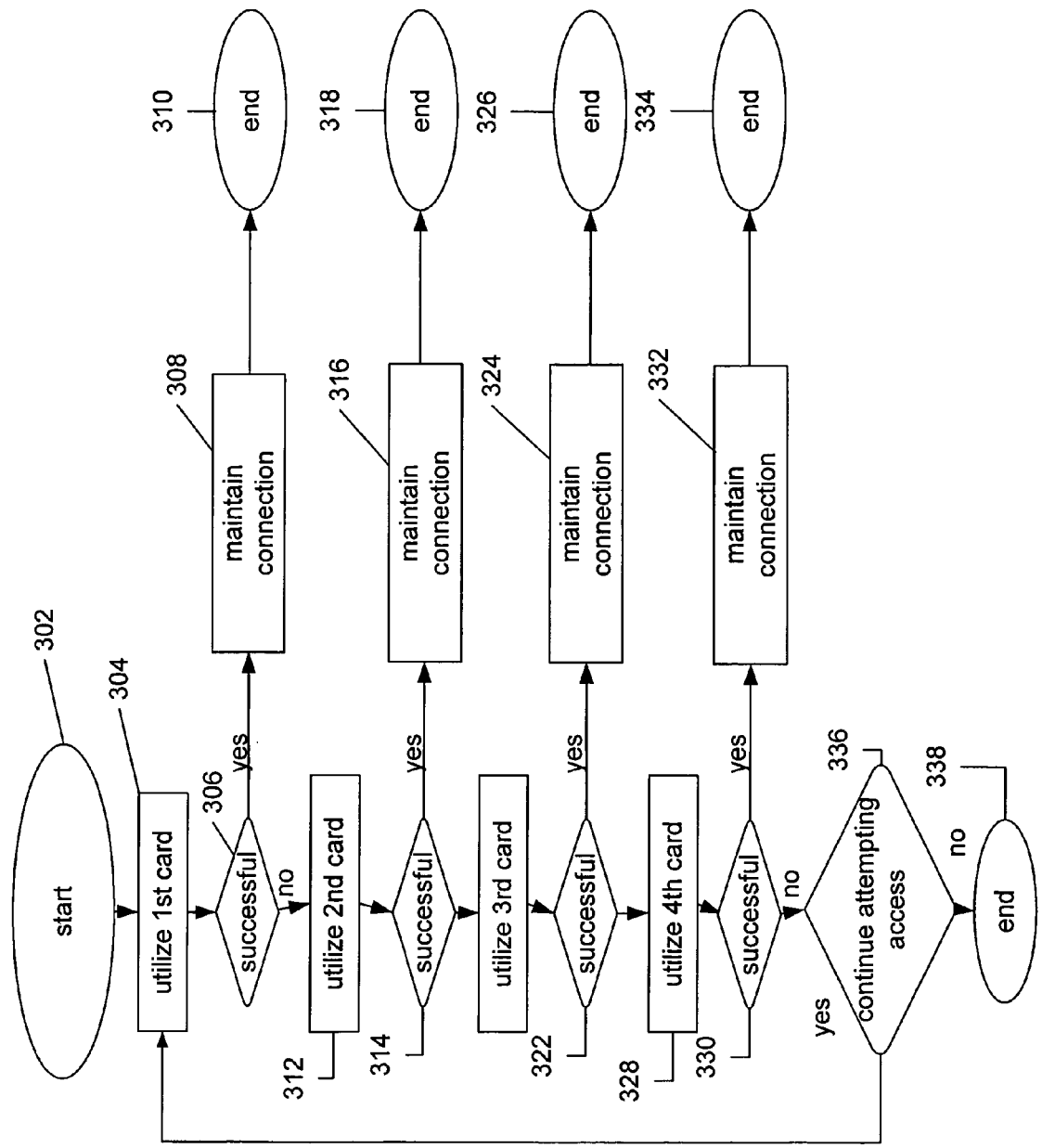
FIG. 3B is a flowchart illustrating an embodiment of a process for grouping a plurality of communication channels.

Referring now to FIG. 3A, as will be appreciated by those of ordinary skill in the pertinent art, the M adapter 220 utilizes many of the same principles as the M adapter 120 described above. Accordingly, like reference numerals preceded by the numeral "2" instead of the numeral "1", are used to indicate like elements whenever possible Referring now to FIG. 3B, a flowchart illustrating an exemplary process for the M adapter 220 to virtually group communication cards is referred to generally by the reference numeral 300. To start a successful connection when a card is hung up (e.g., to alleviate the need to step to the next adapter), the M adapter 220 must recognize the stages of a connection. Typically, the stages of a connection are:

1. SETUP_ACK;
2. ALERT;
3. CALL_PROCEEDING; and
4. CONN.

Some applications want to establish a call in "Early B3" mode,e.g., "connect" as soon as a B-Channel with local tones from the PBX 110 is available. In the preferred embodiment, the M adapter 220 is configured to use only "CONN" as indication for a successful call establishment. For an example of how this configuration is useful, consider a fax broadcast, the M adapter 220 must overcome possible local PBX or transit PBX problems.

At step 302, an exemplary selection process begins. The M adapter 220 is in communication with the four communication cards (see FIG. 3A) although many combinations of cards are practical as would be appreciated by one of ordinary skill in the pertinent art. As a result, the M adapter 220 recognizes the status of each card such as whether or not a layer 1 problem exists with the card and the like. If a card has a layer 1 problem, the M adapter 220 will not attempt to use such card during the initial attempts at establishing a connection. For simplicity, the present example proceeds as if none of the cards have a layer 1 problem.

At step 304, the M adapter 120 attempts to utilize the first of the four communication cards or adapters 222 and the process proceeds to step 306 to determine if the attempt was successful. If the attempt is successful, the process proceeds to step 308 where the connection is maintained until disconnection. Upon disconnection, the process 300 proceeds to step 310 to terminate.

Referring again to step 306, the process 300 may not be successful in attempting to utilize the first card 222 and proceeds to step 312 in order to to switch to the next adapter 222. A plurality of reasons may cause the failure such as, without limitation:

1. an interface problem (Layer 1);
2. a Layer 2 problem (signaling link problem); and
3. an indication that failure happened on the local PBX 110 or on the transit PBX.

At step 312, the M adapter 220 attempts to establish a connection with the second card 222 and the success of this attempt is evaluated at step 314. Similar to above, if successful, the M adapter 220 maintains the connection at step 316 until terminated at step 318. If unsuccessful at step 314, the M adapter 220 attempts to utilize the third card 222 at step 320. Again the M adapter 220 evaluates the success of the attempt at step 322 and proceeds to steps 324, 326 or 328 as appropriate where the coonection is attempted with the fourth card at steps 330-334.

At step 336, if the attempts at connection have failed, the M adapter 220 determines whether or not to continue retrying. If the decision is made to stop, the M adapter 220 proceeds to step 338 and the process 300 terminates. Preferably, the M adapter 220 restarts at step 304 in a second pass to overcome possible Layer 2 problems that can arrive with some PBX (e.g., some PBX fail to establish Layer 2 signaling link connections "one demand" due to TEI management problems, also this is necessary to try two times). Eventually, if a connection is not established, the M adapter 220 arrives back at step 336 where a third and fourth round through the process 300 are attempted. However, during the third and fourth rounds, the M adapter 220 attempts to use all adapters 222 (except ignored adapters as noted below). The M adapter 220 ignores a card 222 if:

1. The BRI adapters have an active Layer 1 but indicate a problem to establish Layer 2;
2. The BRI adapters are indicated as scheduled for removal by Management software; and
3. The BRI adapters failed and in the process of restart.

Figure 4:
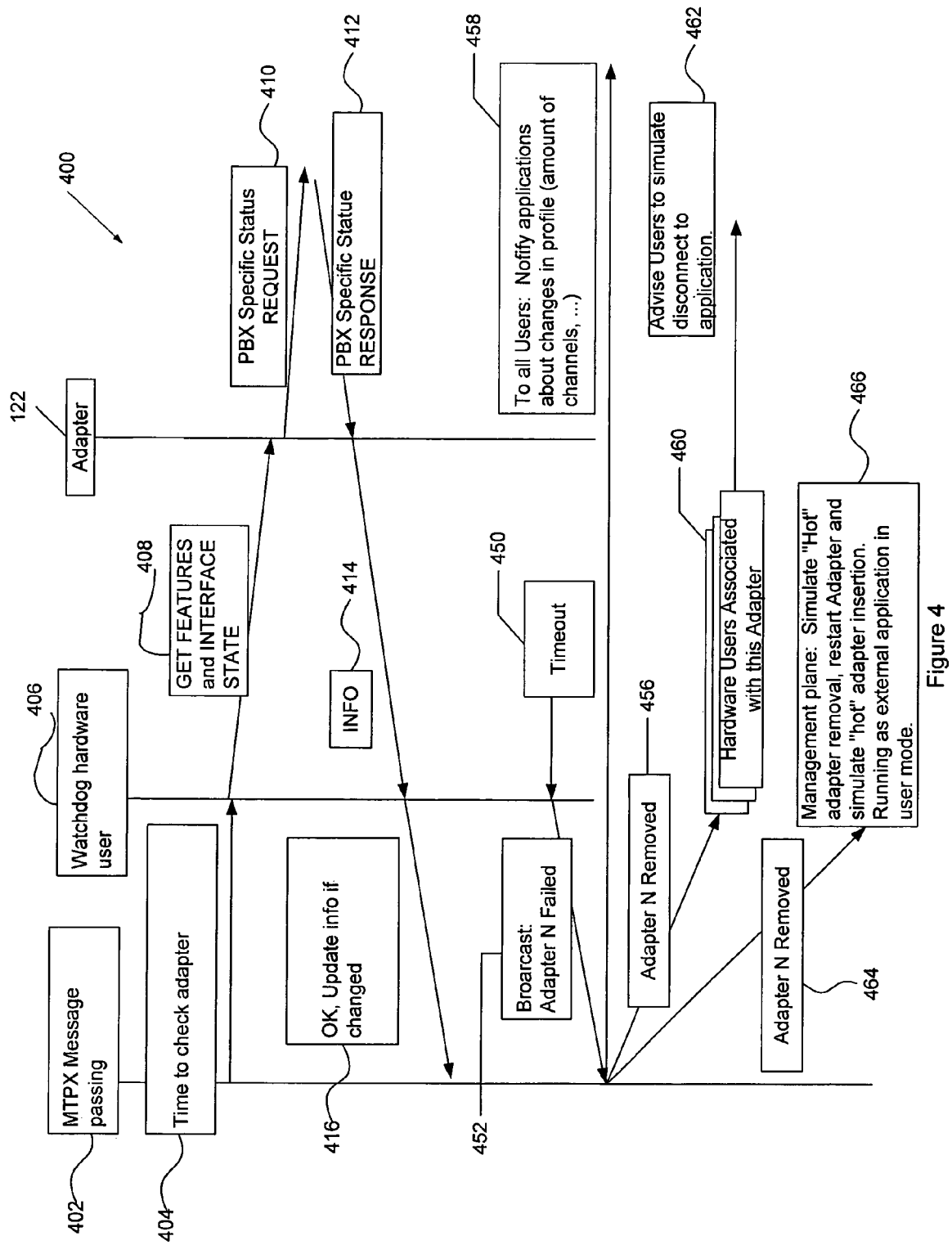
FIG. 4 is a somewhat schematic view of a process for reloading and restarting an unoperational communication channel.

Referring now to FIG. 4, a process for reloading and restarting an unoperational communication channel is referred to generally by the reference numeral 400. Across the top of FIG. 4, MTPX, watchdog hardware and adapter items are identified as items 402, 406 and 122, respectively. Each of these items 402, 406 and 122 indicates the hardware that prompts the associated action. At step 402, the process 400 starts by having the M adapter 120 actively pass messages. It is envisioned that the process 400 could also utilize the configuration of M adapter 220 as well as many others as would be appreciated by those of ordinary skill in the art. At step 404, the M adapter 120 checks the state of the adapter 122 when watchdog hardware prompts a check (see itme 406). The M adapter 120 is responsible for retrieval of the state of the adapter capabilities, the state of the adapter interface and the state of the network capabilities if supported by the PBX 110 as shown in item 408. Typically, the information is retrieved by a REQUEST as shown in item 410. An answer from the PBX 110 is optional and, for illustration, one is shown in item 412. The informaton received from the PBX 110 passes back to the M adapter 120 where the status information is updated as shown at items 414 and 416, respectively.

In another embodiment, the M adpater 120 begins the process 400 by accessing a configuration file that indicates the communication cards 122 that have been operatively connected thereto. The M adapter 120 checks each communication card 122 to ascertain the status thereof. If the status of each card 122 is operational, the M adapter 120 proceeds to the next card 122 and repeats the process for every card 122. If the status is unoperational or a card 122 is newly inserted, the M adapter 120 reloads and restarts the subject communication card as appropriate in a manner well within the skill of one in the pertinent art based upon review of the subject disclosure.

In another embodiment, the MTPX adapter 120 performs the following procedure every 20 seconds on every contained MTPX adapter XDI adapter:

1. Send "LAW and PROFILE" request to adapter.
2. Receive acknowledge (confirms request) from adapter.
3. Receive Law and Profile indication from adapter. This indication contains information about current configuration of G.711 voice Codec (a-Law or m-Law); Information about all supported by this adapter bearer protocols; and Amount of supported bearer channels.
4. Send "S_SUPPORTED" request to adapter.
5. Receive acknowledgement.
6. Diva adapter creates list of available signaling protocol features. Optional Diva adapter can update this list from PBX using vendor specific request.
7. Receive S_SUPPORTED indication. This information contains information about all supported by signaling protocol services.
8. Send STATUS REQ.
9. Receive acknowledgement.
10. Receive STATUS indication. This indication contains information about:
    Status of interface Layer 1
    Status of interface Layer 2
    Optionally, the adapter can use a PBX check procedure (e.g., send vendor specific sequence of messages to PBX) and obtain status of PBX signaling Layer 3
    Layer 1/Layer 2 signaling link statistics (how much frames was sent/received, how many errors were detected).
11. Check if profile of the adapter changed (for example some DSP's of adapter are out of service, PBX reported about new features or about unavailability of some features.
12. If the case profile is changed, then send Profile change notification to all applications.
13. Wait 20 seconds and restart procedure from step 1 again.

Still referring to FIG. 4, if any one of the above operations takes more than 20 seconds, then the subject XDI adapter is considered as not operating any more. As a result, the following procedure that starts at step 450 is issued. At step 452, the M adapter 120 send to all Hardware users (EXdi XDI entities) an adapter removed notification. The broadcast notification (for example caused by failure of Layer 1) causes simulation of unexpected, disconnects towards User entities, towards applications and high level interface.

At step 456, the problematic adapter is removed from the list of active XDI adapters, to free all resources occupied by this adapter. At step 458, as result of the adapter failure and subsequent removal of the failed adapter after detection, one profile change notification is sent to all applications. But this time an additional info element that informs applications about how to identify the failed adapter is added to the law and profile indication. The OS specifically responsible for low level hardware access (such as a WMP—Ndis Wan Miniport driver for MS Windows OS) will receive this indication and inform the OS specific layer about the failure of hardware. Optionally, a low level driver will restart hardware. In this case, the MTPX adapter 120 will receive notification about the start of Diva adapter and insert this adapter in the list of active adapters. As shown in items 460 and 462, the hardware users associated with the adapter recognize the removal and are advised to simulate disconnection so that efforts at using the failed are conserved.

Still referring to FIG. 4, it is to be appreciated that multiple removals of failed adapters may occurs as shown in item 464. However, in this instance, the failure may be due to a hot adapter removal. As shown in item 466, a replacement adapter is restarted so that it can be utilized.

Referring to FIG. 5, a process for transferring a call in a PBX environment where the PBX switch does not support call transfers is referred to generally by the reference numeral 500. At step 502, the process 500 starts. At step 504, the PBX 110 receives from an application a FACILITY Req with request for a call transfer. The PBX 110 forwards the call transfer request to the M adapter 120. The call transfer request includes information about the failure of the call transfer attempt and the process 500 proceeds to step 506.

At step 506, the M adapter 120 decodes a context of the FACILITY request and determines the second user entity involved in the call transfer operation. At step 508, the M adapter 120 freezes the state of both user entities, i.e. the processing of all user messages is suspended for both entities. At step 510, the M adapter 120 sends a Line interconnect request to both hardware entities (e.g., XDI entities) associated with the invloved user entities. If both user entities are located on the same adapter, then a Line interconnect request is sent to this adapter. If the user entities are located on different adapters, then a Cross Board switching request is sent to both adapters.

At step 512, the M adapter 120 receives an acknowledgement about the state of the Line interconnection procedure from the corresponding adapter or adapters as the case may be. At step 514, if the acknowledgement indicates success, then the process 500 proceeds to step 520 where termination occurs as described below. If the acknowledgement idicates failure, i.e., FAILED such as if an adapter is out of resources, then the M adapter 120 restores the state associated with both entities hardware, and resumes processing of the messages on both user entities. The M adapter 120 sends to the originator of the call transfer a FACILITY request that contains the status of the operation such as failed due to local equipment congestion and the process 500 proceeds to step 516.

At step 516, if the acknowledgement indicates failure, then the M adapter 120 creates two secondary applications located in an MTPX adapter. The two applications are associated with each user entity application. Then, the M adapter synchronizes the state of user entities and transfers ownership over of the associated XDI entities to new user entities and proceeds to step 518.

At step 518, the M adapter 120 can finally send a FACILITY request response with status SUCCESS to the originator of the call transfer. The M adapter 120 simulates disconnect to both secondary applications. At step 520, the two new secondary applications control the line interconnect construct and can be accessed via the management plane (e.g., a management interface). From the management plane, the two new secondary applications can be disconnected upon completion of the call. Alternatively, the connection is release as soon as one of involved remote parties releases the connection.

In order to conference a plurality of calls in a PBX environment where the PBX switch does not support call conferencing, the process 500 of FIG. 5 is modified. In short, the process is the same except that at step 510 instead of a line interconnect being sent, a "Conference" request is sent by the M adapter that allows the originating entity to connect as well as would be appreciated by those of ordinary skill in the art. The original user entities would still preserve control over the conference call to allow removal of one party from the conference or to add new party to the conference on an ongoing basis.

The M adapter 120 can also transparently handle the path replacement proposal when calls are redirected multiple times through multiple PBX to finally arrive at an adapter. The originator PBX typically sends a path replacement proposal to the real destination of the call and a special application is required to handle the path replacement proposal. The M adapter 120 utilizes a path replacement proposal and creates a call as specified in this proposal. Once a new direct connection is established, the M adapter 120 "reroutes" the application to a new connection. The rerouting process is fully transparent for an application. For this reason, the M adapter 120 creates an outgoing call, and informs the hardware that bearer data should be handled as it were an "incoming" connection, i.e. "bearer channel reversal". Finally, the original connection is released to free PBX resources that are occupied through the call forwarding between multiple destinations in order to handle QSIG Path replacement proposal in the transparent to application way.

Moreover the M adapter may abstract the application from the differences in the QSIG dialects between different switches. This is based upon an application being self aware about the need to create a second call to use this new call and to release the older one. Moreover, the information that is passed by the PBX as part of message that informs the application about the possibility of Path Replacement differs from vendor to vendor. If multiple adapters are present in the system, the application should be able to make the decision about the adapter that should be used for the second call or be able to try all adapters. By using the MTPX adapter 120, the application does not need to know about the second call and about the format of information that is passed across the signaling network.

In a similar manner, the originating side of the Path replacement setup (e.g., the side that issued the path replacement) can be implemented. At the originating side, the M adapter 120 is able to issue a Path replacement proposal once the call transfer completion message is received from the network. Again, the actions of the M adapter 120 are fully transparent to the involved applications. In this way, the M adapter 120 abstracts the behavior from the type of PBX. Finally, the M adapter 120 waits until the opposite side calls back, accepts the call, reroutes the application to this new connection, and releases the original connection.

The Transit PBX point (e.g., in the case of the M adapter 120 being part of a PBX between the call originator and call destination (e.g., the "call transfer complete" was sent via the M adapter 120)), the process occurs in a like manner. The application that implements the PBX receives a disconnect once the path replacement procedure is complete. No additional options need to be performed because a regular application is able to redirect the call as necessary. As a result, simple applications are able to operate in ETSI and like networks and benefit from extended services that are available in QSIG networks. This is possible due to fact that the M adapter 120 implements, all features transparent to other applications and due to the fact that the M adapter 120 provides conversion between behavior and parameter coding of real used signaling network and Q.931.

In a preferred embodiment, this conversion is done to 90% on the RISC CPU of the Diva adapter, but the MTPX adapter 120 is the instance that coordinates this behavior. The entire solution (i.e. the MTPX adapter 120 and Diva Adapter) abstract all info elements and supplementary service state machines to coding/behavior of ETSI (Q.931). The MTPX adapter 120 uses this abstraction to provide its own messages to applications and control Diva adapter hardware. For example, a single application will work without any change with: Diva PRI Adapter, ETSI; Diva BRI Adapter QSIG; Diva BRI Adapter DMS; Diva PRI Adapter RBS (Robbed bit signaling); Diva PRI Adapter R2 Signaling; Diva Analog adapter and SS7 protocol. The MTPX adapter 120 that is build on top of this adapter maintains this abstraction too. For example, one QSIG PBX counts bearer channels as "Logical" (e.g. from 1 to 30) and others as "Physical" (1 . . . 14 and 16 . . . 13). The Diva adapter abstracts this always to Q.931. For another example, one PBX used at boundary to a SS7 network provides network specific facility. Diva adapter converts this facility to Q.931 Display info.

The M adapter 120 also can server as an internal call transfer module. The call transfer module is implemented as system service that is running in background to forward calls in accordance with a routing table. The syntax of the call routing table allows using rules. Every rule consists of two parts: an input part that should match the parameter of the incoming call; and an output part that determines what happens with a call and what forwarding features are used. A "ctransfer" submodule detects bearer protocol, if necessary, using the bit transparent stream of data. In the preferred embodiment, the following protocols are supported: HDLC; X.75; V.120; Fax; Modem; DTMF/MF tones; and Human Speech. Additional rules determine what should be done in case of timeout. During the time that the protocol is detected, "ctransfer" can play a Voice File (greeting).

As a call transfer module, a plurality of features are supported that can be used individually and in any combination. One feature is to forward a call at every phase of the call processing such as: immediately, issue ALERT message and forward call, accept a call using Early B3 mode (e.g., connect to the B-Channel to receive local tones, but do not connect to opposite side) and forward a call; and accept a call (e.g. connect to opposite side) and forward a call.

Another feature is "Signaling Masquerading". Signaling masquerading can be accomplished by: forwarding a call as is, without any change in signaling information; and forwarding a call and changing all signaling information. In a preferred embodiment, signaling information includes such exemplary data as Called Party Number/Subaddress, Calling Party Number Address/Subaddress, BC/HLC/LLC, miscellaneous Facilities, and the like.

Another feature is "Bearer Resource Masquerading". Bearer Resource Masquerading includes disconnecting the bearer connection and forwarding a call or disconnecting the bearer connection and forwarding a call by ignoring any request by target application type of the bearer connection and use an application that is suggested by application that initiated the call forwarding. In bearer resource masquerading, all three layers of bearer hardware (Layer 1, Layer 2 and layer 3) can be changed. For example, it is possible to forward a V.110 call to one application that can not request V.110 hardware itself and use this option to advise the MTPX adapter that a V.110 protocol stack should be used. In this case MTPX adapter will ignore the target application hardware settings and use V.110 hardware as requested by the initiator of the call redirection. The Target application will not detect this fact and will be able to transfer data over V.110 connection. The M adapter 120 can also leave the bearer connection in its current state and forward a call. The target application will receive a simulation of the incoming bearer connection as if one were established on request of this application. For example: Forwarding an active modem call from one application to the other without affecting the bearer connection.

Another feature is that a call can be forwarded in one of two modes: broadcast calling mode in which all applications will receive notification about incoming call; and directed redirect mode in which only a specific group (e.g., class) of applications will receive redirected call.

Preferably, one central application such as a global call detector receives all incoming calls and distributes these calls using internal call forwarding although every application can redirect the call. As a result, it is possible to create call processing solutions that consist of multiple applications. For example, in the following processing chain: a global call detector receives an incoming call, determines the call type and forwards the call to a Voice server or to Fax server. For example, a Voice server (IVR, etc.) wants to receive a fax then the Voice server can forward the call to the Fax server and after the reception of the fax, the Fax server can forward a call back to the Voice server.

Another feature is that any application can receive a redirected call. Independent from the current state of the call every application receives full simulation of the incoming call, and inclusive simulation of the incoming bearer connection, if necessary. Even in a case where one application requests EarlyB3 connection on an already established connection, the M adapter 120 shows the requested behavior.

Another feature is the support for raw protocol detection. Some applications can include their own protocol type detector that performs analysis of the incoming data stream to determine the type of the bearer protocol. In case a call is forwarded to a like application, it is possible that connection will fail. This will be case if previous application had already used a first incoming frame to determine the type of the protocol. To prevent this situation, the application that initiated the call redirection can provide a data frame that should be sent to the Target application as if it arrived from the opposite side (this is the first frame that the target application receives).

Another feature is to repeat the delivery of the call. For example, an incoming call or forwarded call may be directed to one specific application that is not available at the moment. The M adapter 120 waits 20 mseconds and repeats delivery of the call. This procedure is preferably repeated up to specific, pre-configured amount of times. This is useful in case the application has some time that passes since the last processed call before an application can receive the next call.

Still another feature is to pass some information such as a call processing history between applications. Still another feature is isolation between the low level interface (e.g., IDI) and high level interface such as CAPI. The M adapter 120 can hide the call transfer details from the application.

While the invention has been described with respect to preferred embodiments, those skilled in the art will readily appreciate that various changes and/or modifications can be made to the invention without departing from the spirit or scope as defined by the appended claims.

What is claimed is:

1. A system for maintaining connections with a public switched telephone network (PSTN) and with devices of a private branch exchange (PBX), wherein the system comprises:
   (a) a personal computer (PC) based server for housing a plurality of printed circuit boards for routing signals onto communication interfaces of the PSTN or the PBX and a plurality of application programming interfaces (APIs) for controlling operation of the communication interfaces;
   (b) a memory for storing an interface routine in the server; and
   (c) a processor in the server, the processor being in communication with the memory for running the interface routine such that the processor is operative to:
   isolate the plurality of APIs from the plurality of printed circuit boards;
   determine whether each of the plurality of printed circuit boards is operational;
   store a state for each of the plurality of printed circuit boards by running a watchdog routine;
   store a state of operation for each of the plurality of printed circuit boards that is operational;
   select, by the plurality of APIs, one of the plurality of printed circuit boards for utilization to complete a connection;
   if the selected printed circuit board is not operational, attempt reload of the selected printed circuit board;
   if the selected printed circuit board is not operational after attempting reload, then store a state of the selected not operational printed circuit board as ignore to prevent the selected printed circuit board from being utilized on subsequent attempts;
   if a state of one of the plurality of printed circuit boards is newly loaded during the watchdog routine, start the newly loaded printed circuit board, determine a state of the newly loaded printed circuit board, store the state of the newly loaded printed circuit board;
   receive a first signal that requests usage of the selected printed circuit board from one of the plurality of APIs;
   if the selected printed circuit board is operational, then direct the first signal to the selected printed circuit board; and
   if the selected printed circuit board is not operational and has an ignore state, choose an alternative printed circuit board without trying the selected non-operational printed circuit board based upon the state of the non-operational selected printed circuit board.

2. A system as recited in claim 1, wherein the processor is further operative to activate a newly added printed circuit board and allow the newly added printed circuit board to be called by any of the plurality of API.

3. A system as recited in claim 1, wherein the first signal is selected from the group consisting of data, a facsimile transmission, and a telephone connection.

4. A system for maintaining connections with a plurality of communication cards of a private branch exchange (PBX), wherein the PBX includes at least one application programming interface (API) for controlling operation of the PBX, the system comprising:
   (a) a PC server having a memory for storing a watchdog routine and a processor for running the watchdog routine; and
   (b) an adapter card in communication with the processor, the adapter card being operative to:
   use the memory for storing an interface routine and state information related to a routine run by the watchdog routine; and
   wherein the processor being further operative to:
      (1) check and store a state of the plurality of communication cards based on a prompt from the watchdog routine;
      (2) test operability of the plurality of communication cards, wherein if one of the communication cards is not operational, attempt reload and restart of the non-operational communication card;
      (3) if the non-operational communication card is still not operational after attempting reload and restart, then prevent the non-operational communication card from being called and disassociate all resources utilized by the non-operational communication card by identifying a state of the non-operational communication card as non-operational;
(4) if the state of one of the plurality of communication cards is newly loaded, attempt load and start of the newly loaded communication card;
(5) if the newly loaded communication card is not operational after attempting load and start, then prevent the newly loaded communication card from being called and disassociate all resources utilized by the newly loaded communication card by identifying a state of the newly loaded communication card as non-operational;
(6) receive a signal that requests utilization of a communication card from the at least one API;
(7) if the requested communication card is operational, then direct the signal to the requested communication card; and
(8) if the requested communication card is not operational based on the checking of the state of the plurality of communication cards, then choose an alternative communication card from the plurality of communication cards without trying the requested communication card.

5. A system as recited in claim 4, wherein the processor is further operative to notify the plurality of API that communication cards are not operational and to simulate disconnection thereof.

6. A system as recited in claim 4, wherein the processor is further operative to check the state periodically.

7. A system as recited in claim 4, wherein the processor checks the state approximately every 20 seconds.

8. A system as recited in claim 4, wherein the processor is further operative to:
isolate the at least one API from the plurality of communication cards.

9. A method for maintaining connections between devices of a private branch exchange (PBX) or public switched telephone network (PSTN) using a personal computer running a server program having a plurality of interface printed circuit boards and a plurality of application programming interfaces (APIs) for controlling operation of the PBX or PSTN, the method comprising the steps of:
utilizing each of the plurality of interface printed circuit boards when the plurality of interface printed circuit boards are operational without redundant unused boards;
determining whether any of the plurality of interface printed circuit boards are non-operational;
storing a state for each of the plurality of printed circuit boards by running a watchdog routine;
storing a state of operation for each of the plurality of printed circuit boards that is operational;
selecting, by the plurality of APIs, one of the plurality of printed circuit boards for utilization to complete a connection;
if a selected printed circuit board is not operational, attempting reload of the selected interface printed circuit board;
if the selected printed circuit board is not operational after attempting reload, then marking the selected interface printed circuit board as non-operational;
receiving a signal that calls one of the plurality of interface printed circuit boards from one of the plurality of APIs;
if the selected interface printed circuit board is operational, then directing the signal to the called printed circuit board; and
if the selected interface printed circuit board is marked non-operational, choosing an alternative interface printed circuit board without trying the selected non-operational interface printed circuit board.

\* \* \* \* \*

UNITED STATES PATENT AND TRADEMARK OFFICE
CERTIFICATE OF CORRECTION

| | |
|---|---|
| PATENT NO. | : 8,054,947 B2 |
| APPLICATION NO. | : 11/048044 |
| DATED | : November 8, 2011 |
| INVENTOR(S) | : Vladimir Startsev et al. |

It is certified that error appears in the above-identified patent and that said Letters Patent is hereby corrected as shown below:

On the cover of the patent, item (73), Assignee name: delete "Eicon Networks Corporation, Montreal (CA)" and replace with "Dialogic Corporation, Montreal (CA)"

Signed and Sealed this
Nineteenth Day of February, 2013

Teresa Stanek Rea
*Acting Director of the United States Patent and Trademark Office*